United States Patent
Abdulally

(10) Patent No.: US 10,005,055 B2
(45) Date of Patent: Jun. 26, 2018

(54) ROTARY BOTTOM ASH REGENERATION SYSTEM

(71) Applicant: ALSTOM Technology Ltd, Baden (CH)

(72) Inventor: Iqbal F. Abdulally, Avon, CT (US)

(73) Assignee: GENERAL ELECTRIC TECHNOLOGY GMBH, Baden (CH)

(*) Notice: Subject to any disclaimer, the term of this patent is extended or adjusted under 35 U.S.C. 154(b) by 356 days.

(21) Appl. No.: 14/729,249

(22) Filed: Jun. 3, 2015

(65) Prior Publication Data

US 2015/0265993 A1    Sep. 24, 2015

Related U.S. Application Data

(62) Division of application No. 13/009,262, filed on Jan. 19, 2011, now Pat. No. 9,074,767.

(Continued)

(51) Int. Cl.
  *B01J 8/08*     (2006.01)
  *B01D 53/50*    (2006.01)
  (Continued)

(52) U.S. Cl.
  CPC ............ *B01J 8/082* (2013.01); *B01D 53/508* (2013.01); *B01D 53/96* (2013.01); *B01J 8/0045* (2013.01);
  (Continued)

(58) Field of Classification Search
  CPC .......... F23C 10/00; F23C 10/18; F23C 10/24; F23C 10/26; F23J 1/00; F23J 2900/00;
  (Continued)

(56) References Cited

U.S. PATENT DOCUMENTS 4,421,036 A    12/1983    Braennstroem et al.
4,422,303 A *  12/1983    Rothenberg ............ F28F 27/00
                                                164/455
(Continued)

FOREIGN PATENT DOCUMENTS

CN    101346193 A    1/2009
EP    0 287 815      10/1988
(Continued)

OTHER PUBLICATIONS

Unofficial English translation of Chinese Office Action and Search report issued in connection with corresponding CN Application No. 201110038838.6 dated Mar. 28, 2013.

*Primary Examiner* — Natasha E Young
(74) *Attorney, Agent, or Firm* — GE Global Patent Operation; Stephen G. Midgley

(57)    ABSTRACT

A rotary bottom ash regenerating (RBAR) system [100] comprises a cylindrical body [110] that receives ash [17] containing reactant particles [10] that are partially reacted limestone compounds having unreacted cores [13] from a furnace. Sensors [140] sense physical parameters within the cylindrical body [110]. A controller [170] receives the output of the sensors [140] and information indicating the amount of unreacted core [13] and causes a fluid actuator [135] to spray a proper amount of regeneration fluid regulator [135] from a plurality of spray nozzles [131] to different locations within the cylindrical body [110] to regulate the temperature and to cause the reactant particles [10] to have a require content of regeneration fluid. This causes the reactant particles [10] to be regenerated and reused. This results in a lower limestone costs and less overheating of ash handling systems.

11 Claims, 2 Drawing Sheets

Related U.S. Application Data

(60) Provisional application No. 61/303,491, filed on Feb. 11, 2010.

(51) Int. Cl.

| | | |
|---|---|---|
| *B01D 53/96* | (2006.01) | |
| *F23C 10/26* | (2006.01) | |
| *F23J 1/00* | (2006.01) | |
| *F27B 7/38* | (2006.01) | |
| *F27B 15/10* | (2006.01) | |
| *F27B 15/16* | (2006.01) | |
| *F27D 15/02* | (2006.01) | |
| *B01J 8/00* | (2006.01) | |
| *B01J 8/10* | (2006.01) | |

(52) U.S. Cl.
 CPC ............... *B01J 8/085* (2013.01); *B01J 8/10* (2013.01); *F23C 10/26* (2013.01); *F23J 1/00* (2013.01); *F27B 7/38* (2013.01); *F27B 15/10* (2013.01); *F27B 15/16* (2013.01); *F27D 15/028* (2013.01); *B01D 2251/404* (2013.01); *B01D 2251/606* (2013.01); *B01D 2257/302* (2013.01); *B01D 2259/40083* (2013.01); *B01J 2208/00548* (2013.01); *B01J 2208/00752* (2013.01); *B01J 2208/00761* (2013.01); *B01J 2208/00902* (2013.01); *B01J 2208/00938* (2013.01); *F23J 2900/01005* (2013.01); *F23J 2900/01009* (2013.01)

(58) Field of Classification Search
 CPC .... F23J 2900/01005; F23J 2900/01009; F27D 15/00–15/0206; F27D 15/028; B01D 53/00; B01D 53/34; B01D 53/46; B01D 53/48; B01D 53/50; B01D 53/508; B01D 53/90; B01D 2251/40; B01D 2251/404; B01D 2251/60; B01D 2251/606; B01D 2257/30; B01D 2257/302; B01D 2259/40; B01D 2259/40083; B01J 8/00; B01J 8/0045; B01J 8/015; B01J 8/08; B01J 8/082; B01J 8/085; B01J 8/10; B01J 19/00; B01J 19/18; B01J 2208/00; B01J 2208/00008; B01J 2208/00548; B01J 2208/00743; B01J 2208/00752; B01J 2208/00761; B01J 2208/00796; B01J 2208/00893; B01J 2208/00902; B01J 2208/00938; F27B 7/00; F27B 7/20; F27B 7/38; F27B 15/00; F27B 15/02; F27B 15/10; F27B 15/16
 See application file for complete search history.

(56) References Cited

U.S. PATENT DOCUMENTS

| | | |
|---|---|---|
| 4,424,766 A | 1/1984 | Boyle |
| 4,530,291 A | 7/1985 | Wysk |
| 5,401,481 A | 3/1995 | Rochelle et al. |
| 5,551,357 A | 9/1996 | Song et al. |
| 6,403,024 B1 * | 6/2002 | Oota ............... B22F 9/023 241/30 |
| 7,464,669 B2 * | 12/2008 | Maryamchik .......... F23C 10/18 122/4 D |
| 2009/0008302 A1 | 1/2009 | Matsuo et al. |

FOREIGN PATENT DOCUMENTS

| | | |
|---|---|---|
| EP | 1 188 472 | 3/2002 |
| WO | 96/24810 | 8/1996 |
| WO | 97/06889 | 2/1997 |
| WO | 01/32296 | 5/2001 |

\* cited by examiner

ROTARY BOTTOM ASH REGENERATION SYSTEM

CROSS REFERENCE TO RELATED APPLICATIONS

This is a divisional patent application claiming priority to U.S. patent application Ser. No. 13/009,262, now U.S. Pat. No. 9,074,767, filed Jan. 19, 2011, entitled "ROTARY BOTTOM ASH REGENERATION SYSTEM", which claims priority to U.S. Provisional Patent Application Ser. No. 61/303,491, filed Feb. 11, 2010, both of which are incorporated herein by reference in their entirety.

BACKGROUND

The present invention relates to reactivation of sorbents in furnace ash and more specifically for cooling, hydrating, and reactivating unutilized sulfur abatement sorbents in the furnace bottom ash.

During the combustion of fuels that contains sulfur compounds, such as coal, $SO_2$, SO3 (collectively "SOx") gasses are created. In addition to being green house gases, these gasses when released combine with water to create sulfuric acid ($H_2SO_4$) that is hazardous to the many ecosystems.

Crushed limestone is typically used to neutralize and eliminate the SOx gasses. In circulating fluidized bed (CFB) furnaces, which may be part of a boiler system, crushed limestone is added to the crushed fuel to neutralize the SOx gases during combustion. The combustion creates limestone products that consist of significant amounts of calcium oxide (CaO, unreacted lime) and calcium sulfate ($CaSO_4$) and small amounts of calcium carbonate ($CaCO_3$).

A significant amount of the limestone does not react with the SOx gasses, so typically about twice the stoichiometric amount of the limestone is used to realize satisfactory capture of the SOx gasses. The excess unreacted limestone is removed with the ash generated from the solid fuel combustion. There are two net discharge streams of ash from the CFB, i.e., bottom ash and flyash. Typically, the ash contains limestone product that consists of unutilized CaO. The bottom ash, limestone byproducts and unreacted lime are typically cooled and discarded as waste material.

One such device for cooling bottom ash is a Rotary Ash Cooler (RAC). A RAC is a rotating cylindrical conduit with an inlet at one end and an outlet at the opposite end. It has cooling pipes that run through the conduit wall. Hot bottom ash is received at the inlet and is moved by internal spiral fins to the outlet as the conduit rotates. By the time the bottom ash is at the outlet it has been cooled to the proper temperature. The bottom ash is then disposed with other wastes.

Conventional RAC devices have little or no sensing or adjustment devices. They are set by design and do not have a means of fine temperature control of the ash in the event of an unacceptable rise in temperature. This may occur for several reasons, e.g., with an unusual change in furnace operation, abnormal process conditions, varying fuel supply, or malfunction of other controls.

Excessive bottom ash temperatures may destroy ash-handling systems and may cause damage to the system. Excessive temperature may also create difficulty in transporting and disposing the ash in an environmentally acceptable manner.

Also, there is a significant amount of unused limestone is being wasted increasing operating costs and creating additional waste material that needs to be disposed.

Thus, there is a need for a method and device for more accurately monitoring bottom ash and for increasing the utilization of limestone by reusing unreacted CaO in the bottom ash.

SUMMARY OF THE INVENTION

The present invention may be embodied as rotary bottom ash regeneration (RBAR) system 100 for processing bottom ash 17 of a circulating fluidized bed furnace or a functionally similar device/equipment.

It includes a rotating cylindrical body 110 adapted to receive said ash at its inlet end, at least one sensor 140 disposed within the cylindrical body 110 adapted to measure a physical parameter, such as temperature and humidity, and create at least one output signal representing the measured physical parameter, at least one spray nozzle 131 is adapted to receive a regeneration fluid, such as water, or an aqueous alkaline (base) solution and spray it across different regions of the cylindrical body 110. A regeneration fluid regulator 135 provides the regeneration fluid to the spray nozzles 131 to spray a predetermined amount of regeneration fluid into selected regions of the cylindrical body 110 when activated.

A control unit 170 coupled reads information from the sensors, and receives input regarding the mass of unreacted core 13 within the reactant particles 10. Control unit 170 calculates a proper amount of regeneration fluid to be sprayed at various locations to cause the reactant particles 10 to absorb enough regeneration fluid to be in the 'required content' range. The fluid regulator 135 is then activated to spray the calculated amount from each of the nozzles 131. The required content range is approximately 5-25% of the regeneration fluid required to totally react the entire unreacted core 13.

The present invention may also be embodied as a method of processing bottom ash 17 from a circulating fluidized bed furnace. The bottom ash 17 is placed into a rotating cylindrical body 110.

The temperature along an inside of the cylindrical body 110 is sensed.

Different amounts of regeneration fluid are sprayed onto the ash 17 at different locations within the cylindrical body 110 to create a desired temperature gradient, then spraying a calculated amount of water onto unreacted limestone product particles 10 within the ash to reactivate the particles 10, but not to result in excess water in the ash 17 in order to maintain the ash in the "dry" range of moisture content, which is typically 0 to 5% by weight.

The invention may also be embodied as a method of processing ash 17 from a circulating fluidized bed furnace by placing said bottom ash 17 into a rotating cylindrical body 110, spraying water into a first region of the cylindrical body 110 to cool the ash 17, spraying water into a second region of the cylindrical body 110 to hydrate and reactivate CaO particles 10 present in said ash 17. For example, the CaO in the bottom ash from a typical petcoke fired CFB will be reduced from 23% to at least 13% by weight. This is equivalent to at least a 25% reduction in limestone consumption.

BRIEF DESCRIPTION OF THE DRAWINGS

The subject matter regarded as the invention is particularly pointed out and distinctly claimed in the claims at the conclusion of the specification. The foregoing and other features and advantages of the invention are apparent from the following detailed description taken in conjunction with the accompanying drawings in which:

DESCRIPTION OF THE PREFERRED EMBODIMENT

Theory

Figure 1:
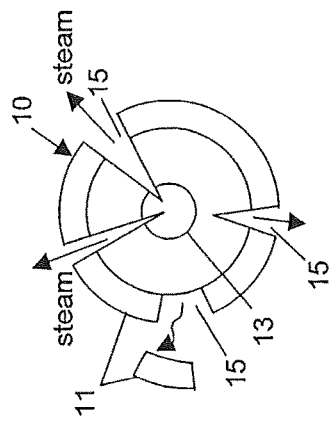
FIG. 1 is a diagram of a cross section of a typical partially reacted, reactant particle 10, in the bottom ash of a CFB furnace.

FIG. 1 is a diagram of a cross section of a typical limestone (CaCO$_3$) particle that has partially reacted with SO$_2$ and/or SO$_3$ compounds (collectively "SOx"). These are referred to as reactant particles 10. These typically fall into the bottom ash of a CFB furnace. During combustion, CaO on the outer exposed surface of the reactant particles 10 has reacted with SOx in the flue gasses to form a CaSO$_4$ capsule 11 covering the reactant particle 10.

$$CaO+SO_2+\tfrac{1}{2}O_2=CaSO_4+heat \qquad (Eq.\ 1)$$

Since the SOx gas cannot penetrate the reactant particle 10 to its core 13, core 13 is comprised of unreacted CaO. The CaSO$_4$ capsule 11 encloses the core 13.

At this point the reactant particle 10 becomes nonreactive. The core 13 is still usable material, but cannot be reached by the SOx gasses. This unused core 13, which can be typically 50% of reactant particle 10 by weight, is typically discarded as waste. Therefore, limestone costs may be significantly reduced if these particles are utilization is maximized.

CaO is fairly reactive. It reacts with water in an exothermic reaction.

It is known that:

$$CaO+H_2O \rightarrow Ca(OH)_2+heat \qquad (Eq.\ 2)$$

This exothermic reaction of Eq. 2 is sufficient enough to cause the additional water present to change immediately to steam. This causes a large increase in pressure within the core 13. If there is enough CaO reacting, the pressure may increase enough to cause the outer capsule 11 to burst. Rapidly expanding steam is the mechanism that causes popcorn to pop. It has been determined that if the proper conditions are met, the particles 10 will pop like popcorn exposing the core 13. The steam leaving the particle can also weaken it to the point that handling and attrition i.e., mechanical breakdown of particles, in the RBAR and CFB can further expose the unutilized CaO.

FIG. 1 shows the reactant particle 10 from FIG. 1 as it is being hydrated. A regeneration fluid, such as water, and aqueous solution of an alkaline material and additionally, steam, is shown soaking through capsule 11 and into a core 13.

Figure 2:
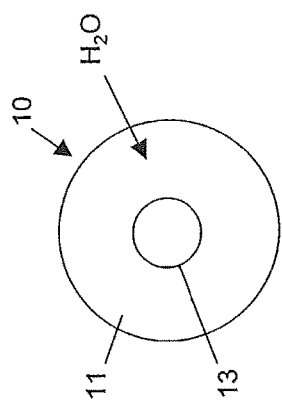
FIG. 2 shows the reactant particle 10 from FIG. 1 as it is being hydrated.

In FIG. 2, CaO is reacting with the water according to Eq. 2 creating significant heat. The excess water is heated to steam if there is a proper amount of water and the reactant particle 10 is at the proper temperature.

Figure 3:
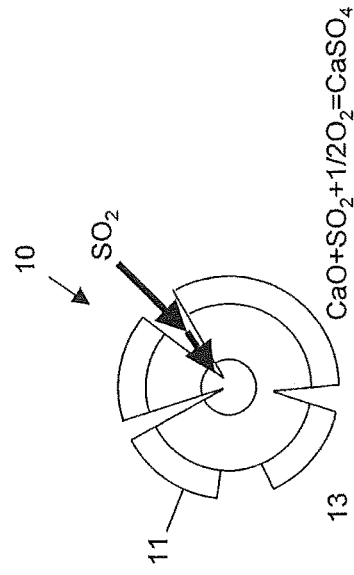
FIG. 3 shows the reactant particle 10 from FIG. 2 after it has been hydrated.

In FIG. 3, the steam has created enough pressure to burst the outer capsule 11 leaving crevices 15 that extend into the core 13. The escaping steam is indicated by the arrows in this figure. The particles 10 are now regenerated and able to be used again.

Figure 4:
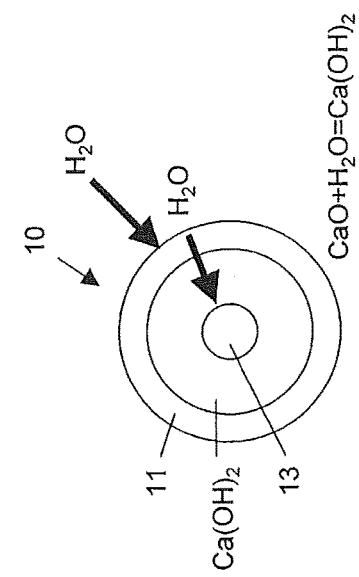
FIG. 4 shows the reactant particle 10 from FIG. 3 being re-used to neutralize SO$_2$ gas.

In FIG. 4, the regenerated particles 10 of FIG. 3 are introduced into flue gasses having SO$_2$. The SO$_2$ passes through the crevices 15 and reacts with the CaO. This captures the SO$_2$ released during combustion in the CFB according to Eq. 3 below.

$$CaO+SO_2+\tfrac{1}{2}O_2=CaSO_4+heat \qquad (Eq.\ 3).$$

If the proper amount of regeneration fluid is used and applied to the particles 10 at the proper temperature, opening of the capsule 11 occurs.

If too much regeneration fluid is provided the solids can end up wet and sticky causing unacceptable handling problems. Additionally, this can cause the temperature to drop quickly enough to prevent enough internal steam from being produced to cause popping.

Too little regeneration fluid limits the amount of regeneration fluid that may soak through the capsule 11 to the core 13. If this amount is not large enough, the reaction may be too small to create enough internal steam pressure to open the capsule 11.

If the temperature drops too quickly, the particles 10 and internal steam may be cooled too much and reduce the steam pressure within the capsule 11, prohibiting opening of the capsule 11.

If particles 10 are too hot, too much regeneration fluid will be evaporated leaving a reduced amount of regeneration fluid that will soak through to the core 13 thereby reducing popping by the lack of regeneration fluid.

Therefore, accurate controls and temperature, humidity and fluid flow sensors and controls are required to achieve the proper treatment of the particles 10 allowing access to the unused inner core 13.

A rotary bottom ash regeneration (RBAR) system functions as a bottom ash cooling system, similar to the RAC. However, the present invention includes sensors, controls and actuators to function in a more accurate manner. It takes into account temperature fluctuations due to unusual changes in furnace operation, abnormal process conditions, varying fuel supply, or malfunction of other controls.

The present invention also acts to recycle particles 10 to improve limestone utilization in a CFB.

This is done by using spray nozzles to adjustably cool the bottom ash in a first section of a rotary ash cooler 121, if required, then use the spray nozzles to hydrate the alkaline particles 10 in the bottom ash once that have been cooled to the proper temperature. In this way the RBAR system cooling capacity can be adjusted while enabling bottom ash hydration/reactivation and recycling.

The amount of regeneration fluid required to cause opening of the capsules 11 of reactant particles 10 (the "required content") is in a range between 5-20% of the stoichiometric amount of regeneration fluid required to totally react all of the CaO in the cores 13 of the particles 10. Since the plant control systems monitors the SOx gases exiting the furnace, it has an accurate indication of the mass of alkaline reactant required to neutralize the SOx gases. However, not all of the reactant reacts. In fact, approximately 50% does not react. Therefore, the mass of reactant provided to the flue gases is twice the amount required. The other 50% remains in the cores 13 of particles 10 in the ash. Therefore, the RBAR system receives information from the plant control system indicating the amount of limestone provided to neutralize the SOx gasses.

The amount of regeneration fluid sprayed into the ash is not the amount of regeneration fluid received by the ash due to evaporation. Water evaporates at various rates based upon the temperature and humidity experienced at a given location, and the spray nozzle 131 parameters. Since there is a decreasing temperature gradient along the length of the rotary ash cooler there are different rates of evaporation at different locations along the RBAR. The temperature gradient and evaporation rates can be experimentally calculated for a plurality of locations along the rotary ash cooler. This evaporation loss is taken into account when calculating the amount of water to spray from each location along the length of the rotary ash cooler. The goal is to spray enough water to cause the particles 10 to receive the 5-20% of the stoichiometric amount of water. Receiving less or more than this range is ineffective at opening capsules 11 and regenerating the reactant particles 10.

Figure 5:
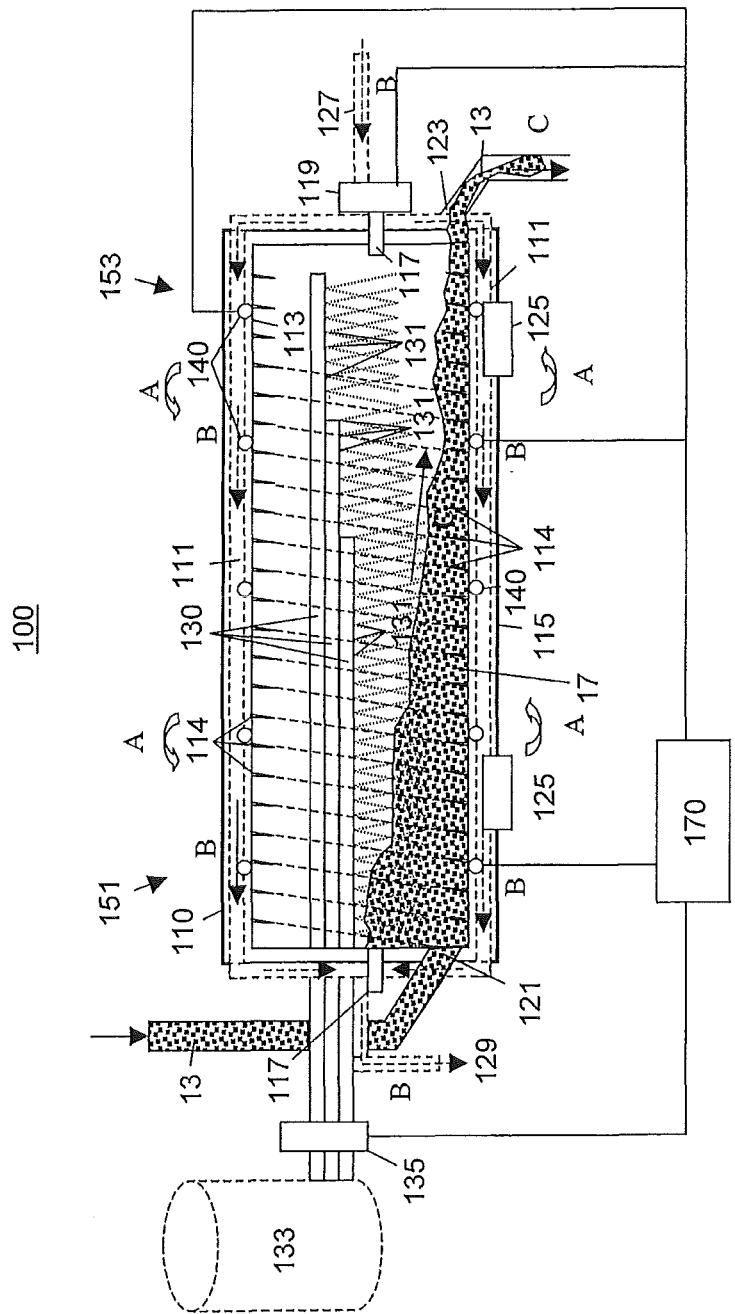
FIG. 5 is a schematic diagram of a rotary bottom ash regeneration (RBAR) system according to the present invention.

FIG. 5 is a schematic diagram of an RBAR system 100 according to the present invention. Hot bottom ash 17 from a circulating fluidized bed (CFB) furnace is provided to an inlet 121 at an input end 151 of a cylindrical body 110 of the RBAR 100. Cylindrical body 110 also has an outlet 123 at an output end 153 opening opposite the inlet 121. The cylindrical body 110 is mounted on, and rotates about an axis 117. It is driven by a motor 119. Alternatively, the cylindrical body may rest upon rollers 125 instead of being connected to axis 117.

The cylindrical body 110 has an inner wall 113 with a plurality of spiral, elongated fins 114, resembling a screw thread. As the cylindrical body 110 rotates, the spiral fins 114 move the ash 17 toward, and out of the outlet 123.

There is also a plurality of cooling tubes 111 in contact with the inner wall. These cool the inner wall 113 and the contents of cylindrical body 110. Cylindrical body 110 may also have an outer wall 115 enclosing the cooling tubes 111 and for making a smooth surface if using rollers 125.

The cooling tubes 111 are fluidically connected to a coolant inlet 127 near the axis 117 of the cylindrical body, and a coolant outlet 129 also near the axis 117 but at the other end of cylindrical body 110. This allows a coolant to be introduced into the coolant inlet 127 be distributed through the plurality of cooling tubes 111 cooling the inner wall 113, and exiting the coolant outlet 129.

There is a plurality of sensors 140 on or near the inner wall 113. These may be temperature sensors, humidity sensors, ash moisture sensors, or weight sensors, or other sensors that can measure physical conditions. The sensors 140 may also measure the amount of bottom ash 17 that has built up in the RBAR. The readings from the sensors 140 are provided to a control unit 170. The control unit 170 reads these readings and determines actions based upon the readings.

A plurality of spray lances 130 extend into the cylindrical body 110. Each spray lance has spray nozzles 131 that spray water in a specific region within the cylindrical body 110 when provided with water.

The spray lances 130 are connected to a regeneration fluid source 133 through a spray actuator 135. The spray actuator 135 is connected to the control unit 170. In this embodiment, each of the spray lances 130 has a different length. Each has spray nozzles 131 at different locations along their lengths. Control unit 170 can selectively spray differing amounts of water to differing regions within cylindrical body 110.

In this embodiment, at least several spray lances 130 have spray nozzles 131 near the cylindrical body inlet 121. Therefore, at least several lances will be spraying water to the same region within cylindrical body 110. The bottom ash is the hottest as it enters at the cylindrical body inlet 121 and is cooled as it passes down the length of the cylindrical body 110 toward cylindrical body outlet 123. Typically, there is also a greater amount of ash 17 at the cylindrical body inlet 121 that gradually reduces to a smaller amount at the cylindrical body outlet 129. Therefore, a greater amount of spray may be required near the cylindrical body inlet 121. The amount of water needed for cooling is greater than for reactivating the limestone products.

Alternatively, a plurality of nozzles 131 are placed at various locations within cylindrical body 110, and each may be individually controlled by control unit 170.

Control unit 170 receives information regarding the amount of SOx reactant provided to the system. Control unit 170 receives information regarding the amount of unreacted core 13 in the ash in the rotary ash cooler. Control unit 170 then calculates the amount of water to be sprayed from each nozzle, taking into account the temperature gradient and the evaporation rate at each nozzle that will result in the required content range of regeneration fluid of the particles 10. The required content range is 5-20% of the stoichiometric amount of water to react all unused SOx reactant at the nozzle location.

In an alternative embodiment, the control unit 170 can determine the mass distribution along the rotary ash cooler and adjust the amounts sprayed according to the mass distribution of the bottom ash 17.

Control unit 170 also monitors the sensors 140 and controls the regeneration fluid regulator 135 to adjust spray through various portions of the cylindrical body 110 to adjust the temperature gradient across cylindrical body 110. This adjustment will be limited to the required concentration range to regenerate the particles 10. Typically, the input end 151 is greater than 700 deg F. (370 degrees C.). In one embodiment, the desired temperature gradient is a transition from typically 1600 degrees F. (871 degrees C.) at the inlet 121 and 120 to 300 degrees F. (60 to 150 degrees C.) at the cylindrical body outlet 123. At some point within the RBAR, a temperature less than 700 degrees F. (370 degrees C.) is reached and hydration will begin and proceed vigorously. The amount of regeneration fluid provided is typically in the range of 1 to 25% of the stoichiometric amount for hydration of all the CaO present in the bottom ash. For example, the stoichiometric amount of water needed for the complete hydration of CaO is 40.9 Kg $H_2O$/100 Kg CaO. Hence, the amount of water typically added (taking into account the amount of evaporation at the spray location) in the hydration section of the RBAR is in the range of 2.0 to 10.2 Kg $H_2O$/100 Kg of CaO. The control unit will also determine by measurement of the ash rate and temperature and provide 5 to 25% of stoichiometric requirements for hydration water when the temperature is below ~700 deg F. (370 degrees C.). In an alternative embodiment, the control system 170 will trim or adjust, within limits the amount of cooling spray water, if required, to provide the desired temperature profile within the cylindrical body 110.

After hydration, the particles 10 in the ash 17 pass out of cylindrical body outlet 123 and may be collected and reused to reduce the total amount of limestone required to operate a CFB furnace.

Another reason that an RAC is selected to be used for the present invention 100 is that the cylindrical body 110 comminutes the hydrated, softened, particles 10 in the ash 17 by physical contact and tumbling. The cylindrical body 110 rotates and carries ash 17 up the inner wall 113 aided by the spiral fins 114. Once the ash gets too high up the inner wall 113, it tumbles back downward to the bottom of the cylindrical body 110. This physical tumbling, similar to a clothes drier, causes physical contact of rubbing, scuffing and impact of the particles 10 against the ash 17, the inner wall and other particles 10. The physical contact will create fractures, cracks and crevices in the capsule 13 of the particles 10 that have been previously hydrated and softened. The physical contact also breaks down the softer hydrated particle and/or wears away the outer capsule 13 potentially exposing the core 11.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A rotary bottom ash regeneration (RBAR) system for processing bottom ash having reactant particles of a circulating fluidized bed furnace comprising:
    a cylindrical body adapted to receive said bottom ash at an inlet end and rotate;
        at least one sensor disposed within the cylindrical body adapted to measure a physical condition, and create at least one output signal representing the measured physical condition;
    at least one spray nozzle adapted to receive a regeneration fluid and to spray the regeneration fluid onto the bottom ash in the cylindrical body;
        a fluid actuator coupled to the at least one spray nozzle adapted to spray a specified amount of regeneration fluid in the cylindrical body;
    a control unit coupled to the sensors and the fluid actuator adapted to:
        receive the sensor output signal and an input regarding the mass of the bottom ash in the cylindrical body,
        calculate an amount of regeneration fluid to be provided to the cylindrical body, based on the measured physical condition and the input regarding the mass of the bottom ash, and
        activate the fluid actuator to provide the calculated amount of regeneration fluid to the bottom ash in the cylindrical body.

2. The RBAR system of claim 1 further comprising:
    a plurality of spiral fins on an inner surface of the cylindrical body arranged such that the bottom ash is passed toward an outlet as the cylindrical body is rotated.

3. The RBAR system of claim 1 wherein the nozzles are connected to a plurality of spray lances and the control unit is adapted to operate the fluid regulator to provide varying amounts of regeneration fluid to different spray lances.

4. The RBAR system of claim 3 wherein the spray lances have a plurality of internal channels leading to different locations within the cylindrical body, and
    the control unit is adapted to operate the fluid actuator to provide varying amounts of regeneration fluid to each of the different channels within the spray lance to spray regeneration fluid over different regions inside of cylindrical body.

5. The RBAR system of claim 1, wherein the control unit is further adapted to calculate amount of regeneration fluid to be sprayed based to cause the reactant particles to have a regeneration fluid concentration within a predetermined range.

6. The RBAR system of claim 5 wherein the control unit interactively controls the fluid actuator to provide 5-25% of the stoichiometric amount of regeneration fluid required for hydration of the reactant particles in said bottom ash.

7. The RBAR system of claim 5, wherein reactant particles of the bottom ash are partially reacted, and wherein the predetermined range is 5-25% of the stoichiometric amount of regeneration fluid required to totally react all of reactant particles.

8. The RBAR system of claim 1, wherein each reactant particle of the bottom ash has a partially reacted outer capsule and an unreacted internal core.

9. The RBAR system of claim 8, wherein the input regarding the mass of the bottom ash in the cylindrical body comprises data regarding of the mass of the unreacted internal core within the rotating cylindrical body.

10. The RBAR system of claim 8 wherein the provided amount of regeneration fluid causes the reacted outer capsules of the reactant particles to open, and exposes the unreacted internal core, thereby reactivating the reactant particles.

11. The RBAR system of claim 1 wherein the cylindrical body comprises a first region and a second region, and wherein the control unit further calculates a first amount of regeneration fluid to be provided to the first region cylindrical body to cool the bottom ash, and a second amount of regeneration fluid to be provided to the second region cylindrical body to totally react all of the unreacted material within the bottom ash.

* * * * *